United States Patent Office 3,098,852
Patented July 23, 1963

3,098,852
17-OXYGENATED ESTRA-1,3,5(10)-TRIEN-4-OLS AND INTERMEDIATES
William F. Johns, Morton Grove, Ill., assignor to G. D. Searle & Co., Chicago, Ill., a corporation of Delaware
No Drawing. Filed Feb. 2, 1962, Ser. No. 170,798
11 Claims. (Cl. 260—239.55)

This invention relates to 17-oxygenated estra-1,3,5(10)-trien-4-ols, intermediates thereto, and processes for the preparation thereof. More particularly, this invention relates to (a) chemical compounds of the formula

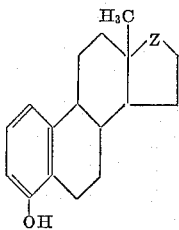

wherein Z represents a carbonyl or optionally-esterified hydroxymethylene radical, and (b) means whereby these compounds can be produced.

Among the esterified hydroxymethylene radicals contemplated Z in the foregoing formula, alkanoyloxymethylene radicals are preferred—especially those in which the alkanoyl constituent is of lower order, i.e., has the formula —CO-lower alkyl By "lower alkyl" is meant methyl, ethyl, propyl, isopropyl, butyl, isobutyl, sec-butyl, tert-butyl, pentyl, neopentyl, hexyl, isohexyl, and like monovalent, saturated, acyclic, straight- or branched-chain, hydrocarbon groupings of empirical formula —$C_nH_{2n+1}$ wherein $n$ represents a positive integer less than 8.

The hydroxymethylene radicals comprehended by Z—whether or not esterified—are most advantageously, though not necessarily exclusively, so disposed in space that the oxy substituent is in β configuration.

It has been found that 17-oxygenated estra-1,3,5(10)-trien-4-ols are useful because of their valuable pharmacological properties. Thus, for example, they reduce the concentration of cholesterol in the plasma relative to phospholipid concentration therein; and, further, they are estrogenic. The intermediates whence such pharmacologically valuable products can be derived are, perforce, likewise valuable.

Preparation of 4-hydroxyestra-1,3,5(10)-trien-17-one proceeds by oxidizing 17β-hydroxyestr-4-en-3-one with hydrogen peroxide in the presence of osmium tetroxide to give 4β,5,17β-trihydroxy-5β-estran-3-one, which is reacted with 1,2-ethanedithiol to give the corresponding ethylenethioketal. The ketal is reduced to 5β-estrane-4β,5,17β-triol with activated Raney nickel, and the hydroxyls at 4 and 17 therein are oxidized to carbonyls with chromium trioxide-pyridine complex. Bromine in acetic acid catalyzed by a trace of hydrogen bromide serves to convert 5-hydroxy-5β-estrane-4,17-dione to the 3-bromo derivative, from which 4-hydroxy-estra-1,3,5(10)-trine-17-one is obtained by heating with lithium chloride in N,N-dimethylformamide.

Alternatively, estra-4-en-17β-ol is oxidized to the 4α,5α-epoxide with perbenzoic acid; and the epoxide is hydrolyzed in the presence of β-toluene-sulfonic acid to give 5α-estrane-4β,5,17β-triol. The hydroxyls at 4 and 17 therein are oxidized to carbonyls with chromium trioxide-pyridine complex, whereupon 3-monobromination is effected with bromine in acetic acid catalyzed by hydrogen bromide and the 3-bromo-5-hydroxy-5α-estrane-4,17-dione thus obtained is converted to 4-hydroxyestra-1,3,5(10)-trien-17-one via lithium chloride in N,N-dimethylformamide.

Still another route to the same product comprises alcoholysis of 4α,5-epoxy-5α-estran-17β-ol with aqueous ethanol to give 4β-ethoxy-5α-estrane-5,17β-diol, followed by chromium trioxide-pyridine complex oxidation of the 17-hydroxyl therein to carbonyl. The resultant compound is converted with boron trifluoride etherate to 5α-estrane-4,17-dione which, in turn, is 3,5-dibrominated with bromine in acetic acid catalyzed by hydrogen bromide. The dibromo compound, on heating with 2,4,6-trimethylpyridine, affords 4-hydroxyestra-1,3,5(10)-trien-17-one. As a variation of this procedure, the 5α-estrane-4,17-dione intermediate in the foregoing sequence can be obtained from 4,17β-dihydroxyestr-4-en-3-one via ketalization with 1,2-ethanedithiol, followed by reduction of the ketal to 5α-estrane-4β,17β-diol with activated Raney nickel and oxidation of the diol to the dione with chromium trioxide-pyridine complex.

Reduction of 4-hydroxyestra-1,3,5(10)-trien-17-one with sodium borohydride affords estra-1,3,5(10)-triene-4,17β-diol.

The 17β-alkanoyloxyestra-1,3,4(10)-trien-4-ols hereof eventuate by reducing 17β-hydroxy-5β-estrane-3,4-dione 3-ethyleneketal with acetonic Raney nickel to give 17β-hydroxy-5α-estran-4-one, which then is esterified ad libitum with an alkanoic acid anhydride in pyridine solution and thereupon is 3,5-dibrominated with bromine in acetic acid catalyzed by hydrogen bromide. The dibromo compound, on heating with 2,4,6-trimethylpyridine, affords the corresponding 17β-alkanolyestra-1,3,5(10)-trien-4-ol.

Reductive cleavage of the 17-ester linkage in the subject 17β-alkanoyloxyestra-1,3,5(10)-trien-4-ols with lithium aluminum hydride provides an alternative route to estra-1,3,5(10)-triene-4,17β-diol.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted. Specific rotations are referred to the D line of sodium.

*Example 1*

A. *4β,5,17β-trihydroxy-5β-estran-3-one.*—To a solution of 50 parts of 17β-hydroxyestr-4-en-3-one in 1750 parts of ether at 0° is added 56 parts of aqueous 30% hydrogen peroxide, followed by 1 part of osmium tetroxide.

The resultant mixture is allowed to stand at room temperature for 18 hours, then consecutively diluted with 400 parts of ice water and—very slowly—40 parts of aqueous 1% potassium hydroxide. The ether phase is separated, washed with water, and stripped of solvent by distillation. The residue is chromatographed on silica gel, using benzene and ethyl acetate in increasing amounts of the latter as developing solvent. From an eluate comprising 25% ethyl acetate in benzene, upon distillation of the solvent and recrystallization of the residue from a mixture of acetone and hexane, is obtained 4β,5,17β-trihydroxy-5β-estran-3-one melting at 184–194°.

B. *4β,5,17β - trihydroxy - 5β - estran - 3 - one ethylenethioketal.*—To a solution of approximately 15 parts of 4β,5,17β-trihydroxy-5β-estran-3-one in 200 parts of acetic acid and approximately 6 parts of 1,2-ethanedithiol is added 9 parts of boron trifluoride etherate. The resultant mixture is allowed to stand at room temperatures for 2½ hours, whereupon 10 parts of solid potassium acetate is mixed in, followed by 800 parts of water. The precipitate which forms is filtered off and extracted into chloroform. The chloroform extract is consecutively washed with water and aqueous potassium bicarbonate, then dried over anhydrous sodium sulfate and finally stripped of most of the solvent by distillation. The concentrate thus obtained is chromatographed on silica gel using benzene and ethyl acetate in increasing amounts of the latter as developing solvent. From an eluate comprising 20% ethyl acetate in benzene, on distillation of solvent and recrystallization of the residue from acetone, is obtained 4β,5,17β-trihydroxy-5β-estran-3-one ethylenethioketal melting at 192–195° and further characterized by a specific rotation of +18°.

C. *5β-estrane-4β,5,17β-triol.*—A mixture of 40 parts of activated Raney nickel and a solution of 11 parts of 4β,5,17β-trihydroxy-5β-estran-3-one ethylenethioketal in 800 parts of 95% ethanol is maintained with agitation at the boiling point under reflux for 20 hours. It is then filtered, and the filtrate is stripped of the bulk of the solvent by distillation. The concentrate thus obtained is chromatographed on silica gel, using benzene and ethyl acetate in increasing amounts of the latter as developing solvent. From eluates comprising upwards of 40% ethyl acetate in benzene, on evaporation of solvent and recrystallization of the residue from acetone, is obtained 5β-estrane-4β,5,17β-triol melting at 182–184° and further characterized by a specific rotation of +23°.

D. *5-hydroxy-5β-estrane-4,17-dione.*—To a slurry of 20 parts of chromium trioxide in 400 parts of pyridine is added a solution of 7 parts of 5β-estrane-4β,5,17β-triol in 200 parts of pyridine. The resultant mixture is maintained at room temperatures with agitation for 20 hours, then partitioned between water and ether. The ether phase is separated, dried over anhydrous sodium sulfate, and stripped of solvent by distillation. The residue, recrystallized from a mixture of acetone and hexane, affords 5-hydroxy-5β-estrane-4,17-dione melting at 185–188° and further characterized by a specific rotation of +28°.

E. *3 - bromo - 5 - hydroxy - 5β - estrane - 4,17 - dione.*—To a solution of 500 parts of 5-hydroxy-5β-estrane-4,17-dione in 25,000 parts of acetic acid containing 4 parts of hydrogen bromide is added, at 10° and during 20 minutes, a solution of 960 parts of bromine in 12,000 parts of acetic acid. The resultant solution is diluted with 50,000 parts of water, and the precipitate thrown down is collected on a filter and washed thereon with water. The material thus obtained, dried in air and thereupon recrystallized from a mixture of acetone and hexane, is 3-bromo-5-hydroxy-5β-estrane-4,17-dione melting at 186–188° and having a specific rotation of +104°.

F. *4-hydroxyestra-1,3,5(10)-trien-17-one.*—A solution of 18 parts of 3-bromo-5-hydroxy-5β-estrane-4,17-dione (preparable by the procedure of the foregoing part E of this example) and 200 parts of lithium chloride in 2900 parts of N,N-dimethylformamide is heated at the boiling point under reflux in an atmosphere of nitrogen for 2½ hours. It is then cooled and diluted with 2 volumes of water. The crystalline precipitate which forms is filtered off and recrystallized from a mixture of acetone and petroleum ether to give 4-hydroxyestra-1,3,5(10)-trien-17-one melting at 270–275°. The product has the formula

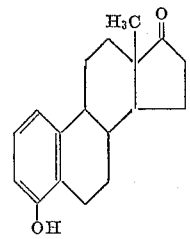

*Example 2*

*Estra-1,3,5(10)-triene-4,17β-diol.*—To a solution of 5 parts of 4-hydroxyestra-1,3,5(10)-trien-17-one in 1600 parts of methanol is added a solution of 1 part of sodium borohydride in 100 parts of water. The resultant solution is maintained with agitation at room temperatures for 4 hours and then consecutively diluted with 100 parts of acetice acid and 1000 parts of water. The precipitate thrown down is filtered off and recrystallized from a mixture of acetone and petroleum ether to give estra-1,3,5(10)-triene-4,17β-diol melting at 200–202°. The product has the formula

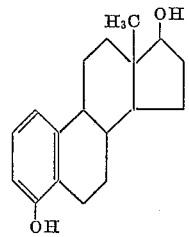

*Example 3*

A. *4α,5-epoxy-5α-estran-17β-ol.*—To a solution of 87 parts of estr-4-en-17β-ol in 1490 parts of chloroform is added a solution of 63 parts of perbenzoic acid in approximately 1200 parts of benzene. The resultant solution is allowed to stand for 65 hours at room temperatures, whereupon it is mixed with approximately 2 volumes of water. The organic solvent phase is separated and thoroughly washed with aqueous 2% potassium hydroxide. It is then stripped of solvent by distillation; and the residue is crystallized from petroleum ether, affording 4α,5-epoxy-5α-estran-17β-ol melting at 135–137° and with a specific rotation of +43°.

B. *5α-estrane-4β,5,17β-triol.*—To a solution of 30 parts of 4α,5-epoxy-5α-estran-17β-ol in 277 parts of acetone is added a solution of 1 part of p-toluenesulfonic acid in 30 parts of water. The resultant solution is maintained with agitation at room temperatures for 30 minutes and then diluted with excess aqueous potassium bicarbonate. Insoluble solids, filtered off and recrystallized from acetone, afford 5α-estrane-4β,5,17β-triol melting at approximately 216–217° and further characterized by a specific rotation of +33°.

C. *5-hydroxy-5α-estrane-4,17-dione.*—To a slurry of 40 parts of chromium trioxide in 600 parts of pyridine is added a solution of 27 parts of 5α-estrane-4β,5,17β-triol in 40 parts of pyridine. The resultant mixture is maintained with agitation at room temperatures for 4 hours and then partitioned between water and ether. The ether phase, separated and dried over anhydrous sodium sulfate, is thereupon stripped of solvent by distillation. The residue, recrystallized from acetone, affords 5-hydroxy-5α-estrane-4,17-dione melting at 228–230°.

D. *3-bromo-5-hydroxy-5α-estrane-4,17 - dione.*—To a solution of 56 parts of 5-hydroxy-5α-estrane-4,17-dione in 2500 parts of acetic acid is added, at 10° during 10 minutes, a solution of 15 parts of bromine in 840 parts of acetic acid. Excess aqueous sodium thiosulfate is thereupon introduced, followed by 5000 parts of water. The precipitated solids are collected on a filter, dried in air, and recrystallized from a mixture of acetone and petroleum ether to give 3-bromo-5-hydroxy-5α-estrane-4,17-dione melting at 175–178° (with decomposition).

E. *4-hydroxyestra-1,3,5(10)-trien-17-one.*—A solution of 62 parts of 3-bromo-5-hydroxy-5α-estrane-4,17-dione (preparable by the procedure of the foregoing part D of this example) and 200 parts of lithium chloride in 4750 parts of N,N-dimethylformamide is heated at the boiling point under reflux in an atmosphere of nitrogen for 2 hours. It is then cooled and poured into 3 volumes of water. The resultant mixture is extracted with chloroform. The chloroform extract is stripped of solvent by distillation; and the residue is chromatographed on silica gel, using benzene and ethyl acetate in increasing amounts of the latter as developing solvent. From an eluate comprising 5% ethyl acetate in benzene, on distillation of solvent and recrystallization of the residue from a mixture of acetone and petroleum ether, is obtained 4-hydroxyestra-1,3,5(10)-trien-17-one melting at 270–275°.

*Example 4*

A. *4β-ethoxy-5α-estrane-5,17β-diol.*—A solution of 20 parts of 4α,5-epoxy-5α-estran-17β-ol in 79 parts of 95% ethanol and 20 parts of water is heated at the boiling point under reflux for 10 minutes and then allowed to cool to room temperature. Approximately 2 hours later the solution is stripped of solvent by distillation; and the residue, crystallized from a mixture of acetone and ether, affords 4β-ethoxy-5α-estrane-5,17β-diol.

B. *4β-ethoxy-5-hydroxy-5α-estran-17-one.*—To a slurry of 5 parts of chromium trioxide in 200 parts of pyridine is added a solution of 3 parts of 4β-ethoxy-5α-estrane-5,17β-diol. The resultant mixture is maintained with agitation at room temperatures for 2 hours and then partitioned between water and ether. The ethereal phase is separated, dried over anhydrous sodium sulfate, and stripped of solvent by distillation. The residue, recrystallized from a mixture of acetone and hexane, affords 4β-ethoxy-5-hydroxy-5α-estran-17-one.

C. *5α-estrane-4,17-dione.*—To a solution of approximately 1 part of 4β-ethoxy-5-hydroxy-5α-estran-17-one in 44 parts of dry benzene is added approximately 6 parts of boron trifluoride etherate. The resultant mixture is maintained at room temperatures for 20 hours, then diluted and mixed with excess aqueous potassium bicarbonate. The benzene phase is separated, consecutively washed with aqueous potassium bicarbonate and water, dried over anhydrous sodium sulfate, and stripped of solvent by distillation. The residue, recrystallized from a mixture of ether and petroleum ether, affords 5α-estrane-4,17-dione melting at approximately 134–135° and having a specific rotation of +119°.

D. *3,5-dibromoestrane-4,17-dione.*—To a solution of 400 parts of 5α-estrane-4,17-dione in 30,000 parts of acetic acid containing 4 parts of hydrogen bromide is added, at 15° during 15 minutes, a solution of 1900 parts of bromine in 12,000 parts of acetic acid. Sufficient aqueous sodium thiosulfate is then introduced to discharge a slight excess of bromine, whereupon the precipitate which has formed is filtered off and dried in air. The product thus isolated is 3,5-dibromoestrane-4,17-dione.

E. *4-hydroxyestra-1,3,5(10)-trien-17-one.*—A mixture of 1 part of 3,5-dibromoestrane-4,17-dione (preparable by the procedure of the foregoing part D of this example) and 27 parts of 2,4,6-trimethylpyridine is heated at the boiling point under reflux for 30 minutes, then cooled and poured into excess dilute hydrochloric acid. The resultant mixture is extracted with benzene. The benzene extract is washed with water, dried over anhydrous sodium sulfate, and stripped of solvent by distillation. The residue is chromatographed on silica gel, using benzene and ethyl acetate in increasing amounts of the latter as developing solvent. From an eluate comprising 2% ethyl acetate in benzene, on distillation of solvent and recrystallization of the residue from acetone, there is obtained 4-hydroxyestra-1,3,5(10)-trien-17-one melting at 270–275°.

*Example 5*

A. *17β - hydroxyestran-3,4-dione-3-ethylenethioketal.*—To a solution of approximately 10 parts of 4,17β-dihydroxyestr-4-en-3-one in 17 parts of 1,2-ethanedithiol and 30 parts of acetic acid is added 7 parts of boron trifluoride etherate. The resultant mixture is maintained at room temperatures for 10 minutes, then diluted with 72 parts of methanol. The insoluble solids which result are filtered out and recrystallized from chloroform, affording 17β-hydroxy-5β-estran-3,4-dione 3-ethylenethioketal melting at 282–286° and further characterized by a specific rotation of —68°. From the mother liquors, on further dilution with water, an additional precipitate is obtained. This material, recrystallized from acetone, is 17β-hydroxy-5α-estran-3,4-dione 3-ethylenethioketal melting at 212–215° and having a specific rotation of +120°.

B. *5-estrane-4β,17β-diol.*—A mixture of 10 parts of activated Raney nickel and a solution of 1 part of 17β-hydroxy-5β-estran - 3,4 - dione 3-ethylenethioketal in 80 parts of 95% ethanol is heated at the boiling point under reflux with agitation for 14 hours. It is then filtered, and the filtrate is concentrated to a semicrystalline residue. Recrystallization of the residue from a mixture of ether and petroleum ether affords 5α-estrane-4β,17β-diol melting at 157–159° and having a specific rotation of +29°.

C. *5α-estrane-4,17-dione.*—To a slurry of 10 parts of chromium trioxide in 200 parts of pyridine is added a solution of 7 parts of 5α-estrane-4β,17β-diol in 100 parts of pyridine. The resultant mixture is allowed to stand at room temperatures overnight. It is then diluted with water, and the mixture thus obtained is extracted with ether. The ether extract is washed with water, dried over anhydrous sodium sulfate, and stripped of solvent by distillation. The residue, recrystallized from a mixture of acetone and petroleum ether, affords 5α-estrane-4,17-dione melting at approximately 134–135° and having a specific rotation of +119°.

*Example 6*

A. *17β-hydroxy-5α-estran-4-one.*—A mixture of 60 parts of activated Raney nickel and a solution of 15 parts of 17β-hydroxy-5β-estran-3,4-dione 3-ethylenethioketal in 480 parts of 95% ethanol and 320 parts of acetone is heated at the boiling point under reflux with vigorous agitation for 4 hours. It is then filtered, and the filtrate is stripped of solvent by distillation. The residue is chromatographed on silica gel, using benzene and ethyl acetate in increasing amounts of the latter as developing solvent. From an eluate comprising 3% ethyl acetate in benzene, on distillation of solvent and recrystallization of the residue from a mixture of acetone and petroleum ether, there is obtained 17β-hydroxy-5α-estran-4-one melting at 184–187° and further characterized by a specific rotation of +24°.

B. *17β-acetoxy-5α-estran-4-one.*—A solution of approximately 1 part of 17β-hydroxy-5α-estran-4-one in 40 parts of pyridine and 20 parts of acetic anhydride is heated at around 100° for 15 minutes, then cooled and diluted with 3 volumes of water. The crystalline material thrown down is filtered off, dried in air, and recrystallized from a mixture of acetone and petroleum ether to give 17β-acetoxy-5α-estran-4-one melting at approximately 140–141°.

C. *17β-acetoxy-3,5-dibromoestran-4-one.*—To a solution of 400 parts of 17β-acetoxy-5α-estran-4-one in 30,000 parts of acetic acid containing 4 parts of hydrogen bromide is added, at 15° during 15 minutes, a solution of 1440 parts of bromine in 18,000 parts of acetic acid. Sufficient aqueous sodium thiosulfate is then introduced to discharge excess bromine, followed by 100,000 parts of water. Insoluble solids are filtered off, dried in air, and recrystallized from a mixture of acetone and petroleum ether to give 17β-acetoxy-3,5-dibromoestran-4-one melting at approximately 169° (with decomposition).

D. *17β-acetoxyestra-1,3,5(10)-trien-4-ol.*—A solution of approximately 1 part of 17β-acetoxy-3,5-dibromoestran-4-one (preparable by the procedure of the foregoing Part C of this example) in 27 parts of 2,4,6-trimethylpyridine is heated at the boiling point under reflux for 30 minutes, then cooled and diluted with excess dilute hydrochloric acid. The resultant mixture is extracted with benzene. The benzene extract is washed with water, dried over anhydrous sodium sulfate, and stripped of solvent by distillation. The residue, recrystallized from a mixture of acetone and petroleum ether, affords 17β-acetoxyestra-1,3,5(10)-trien-4-ol melting at 199–201°. The product has the formula

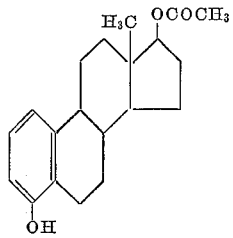

*Example 7*

*Estra-1,3,5(10)-triene-4,17β-diol.*—To a solution of 4 parts of lithium aluminum hydride in 710 parts of ether is added, during 10 minutes, a solution of 4 parts of 17β-acetoxyestra-1,3,5(10)-trien-4-ol in 710 parts of ether. The resultant solution is allowed to stand at room temperatures for 30 minutes, then consecutively diluted with 36 parts of ethyl acetate, 100 parts of water, and 100 parts of 7% hydrochloric acid. The mixture thus obtained is extracted with ethyl acetate. The acetate extract is dried over anhydrous sodium sulfate and stripped of solvent by distillation. The residue, recrystallized from a mixture of acetone and petroleum ether, affords estra-1,3,5(10)-triene-4,17β-diol melting at 200–202°.

What is claimed is:
1. A compound of the formula

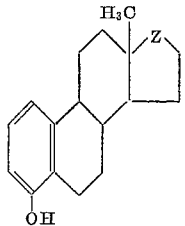

wherein Z represents a member of the group consisting of carbonyl, β-hydroxymethylene, and β-(lower alkanoyloxy)methylene radicals.

2. 4-hydroxyestra-1,3,5(10)-trien-17-one.
3. Estra-1,3,5(10)-triene-4,17β-diol.
4. 17β-acetoxyestra-1,3,5(10)-trien-4-ol.
5. 4β,5,17β-trihydroxy-5β-estran-3-one.
6. 4α,5-epoxy-5α-estran-17β-ol.

7. A compound of the formula

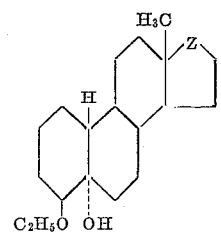

wherein Z represents a member of the group consisting of β-hydroxymethylene and carbonyl radicals.

8. 5α-estrane-4,17-dione.
9. 5α-estrane-4β,17β-diol.
10. A compound selected from the group consisting of a compound of the formula

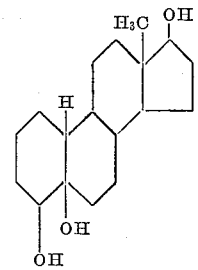

and a compound of the formula

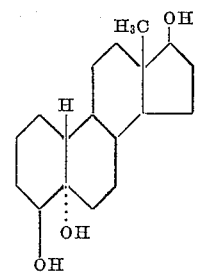

11. A compound selected from the group consisting of a compound of the formula

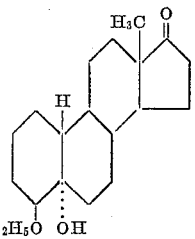

and a compound of the formula

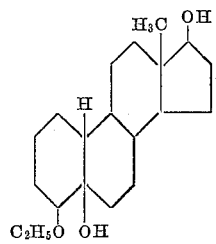

No references cited.